Aug. 27, 1968    SEIICHI MAMIYA ETAL    3,398,666
CAMERA FOCUS ADJUSTING MECHANISM
Filed Jan. 20, 1966

Seiichi Mamiya,
Susumu Mamiya and
Hiroshi Mamiya INVENTORS

BY Wenderoth,
Lind and Ponack, attorneys

United States Patent Office 3,398,666
Patented Aug. 27, 1968

3,398,666
CAMERA FOCUS ADJUSTING MECHANISM
Seiichi Mamiya, 8–6 2-chome, Nishikata, Bunkyo-ku; Susumu Mamiya, 2–2 1-chome, Hiratsuka, Shinagawa-ku; and Hiroshi Mamiya, 8–6 2-chome, Nishikata, Bunkyo-ku, all of Tokyo-to, Japan
Filed Jan. 20, 1966, Ser. No. 521,941
Claims priority, application Japan, Feb. 26, 1965, 40/11,150
4 Claims. (Cl. 95—45)

ABSTRACT OF THE DISCLOSURE

A focus adjusting mechanism for a photographic camera having a lens support member for holding a lens structure which is pivotally mounted on the camera with the pivotal mounting being movably mounted for movement between two extreme positions in a straight line parallel to the optical axis of the camera. The focus adjusting mechanism has an extension lever structure with one end pivotally connected to the lens support member and the other end pivotally mounted on a mounting structure which is movable in a circular arc generally transverse to the optical axis of the camera. A rotating device is coupled to the extension lever structure and to the mounting structure for simultaneously rotating the extension lever structure around the pivotal mounting on the mounting structure, and moving the mounting structure through the circular arc so that the lens support member is moved in a straight line parallel to the axis of the camera.

---

Figure 1:
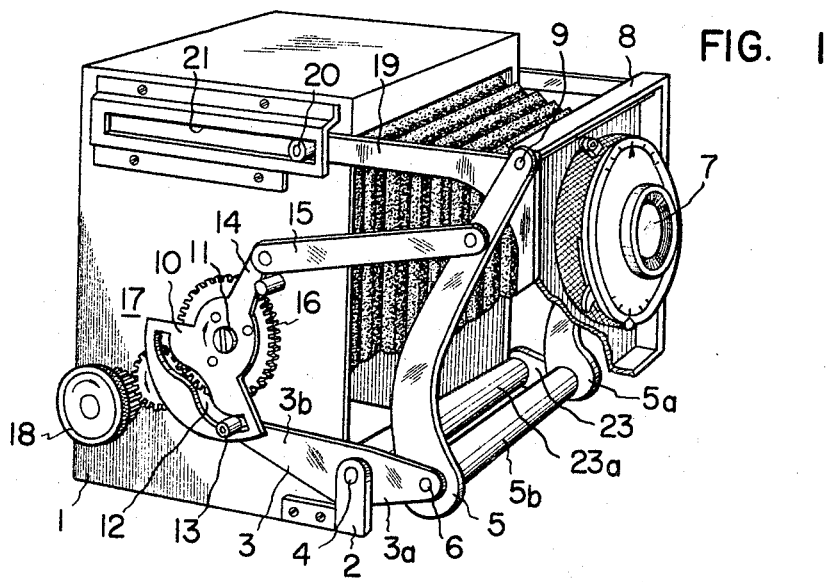

This invention relates to photographic cameras and more particularly to a new focus adjusting device for cameras with highly desirable features.

It is an object of the present invention to provide a focus adjusting mechanism for cameras wherein the lens support structure can be operated smoothly through a wide range of focus adjusting movement.

Another object of the invention is to provide a mechanism of the above stated character which has a simple construction and operation.

The foregoing objects have been achieved by the present invention which, briefly stated, resides in a focus adjusting mechanism for cameras which comprises, in combination, an extension lever structure rotatably supported at one end thereof by movable pivot means and rotatably connected at the other end thereof to a lens support supporting the camera lens, means to rotate the extension lever structure about the movable pivot means and simultaneously cause the movable pivot means to undergo a movement interrelated to the rotation of the extension lever structure in a manner to cause said other end of said structure to undergo straight-line movement parallel to the optical axis of the lens thereby to cause the lens to undergo straight-line movement along its optical axis, and means to maintain the angular orientation of the lens constant with respect to the optical axis.

Figure 2:
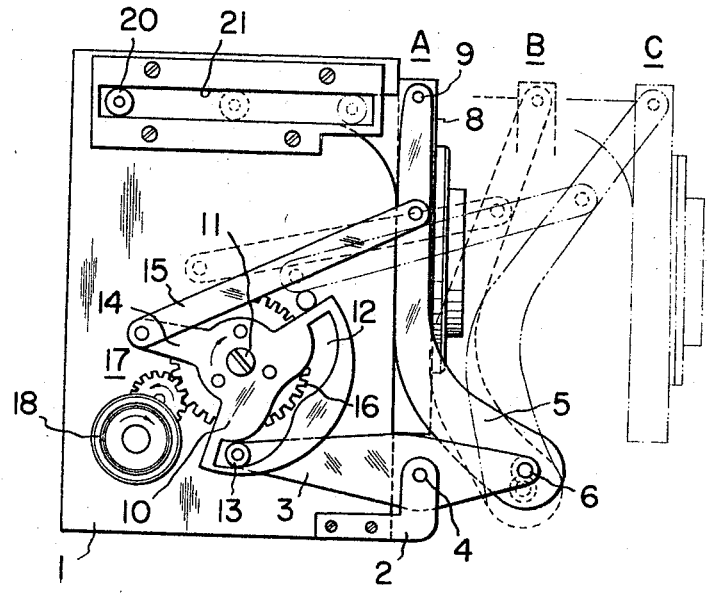

The nature, principle, and details of the invention will be more clearly apparent from the following detailed description with respect to a preferred embodiment of the invention when read in conjunction with the accompanying drawing in which like parts are designated by like reference numerals, and in which:

FIGURE 1 is a perspective view of a camera, with parts not essential to the invention removed and a part cut away, showing an embodiment of the focus adjusting mechanism according to the invention; and FIGURE 2 is a side elevational view of the mechanism shown in FIGURE 1.

Referring to the drawing, the camera shown therein has a main structural body 1 and a lens (or lens group) 7 rigidly or exchangeably supported by a lens support 8, which lens 7 is adjustably movable relative to a photosensitive medium (not shown) within the body 1 by the focus adjusting mechanism of the invention.

The lens support 8 is provided at its upper part with two parallel rigid extension arms 19 extending rearwardly on opposite sides of the camera body 1 in directions substantially parallel to the optical axis of the lens 7 and constituting an integral structure together with the lens support 8. This structure is provided at the rear extremities of the arms 19 with respective rollers 20 guidably rollable in respective straight guide slots 21 extending in directions parallel to the optical axis on opposite sides of the camera body 1. Said structure is further supported, at the upper part of the lens support 8, by the upper extremities of two extension levers 5 and 5a connected to the lens support 8 by pin joints 9, lever 5 being on the right-hand side of the lens support 8.

The extension levers 5 and 5a are rotatably supported at their lower ends on pins 6 on the forward ends of the forward arm 3a of a support lever 3 on the right-hand side of the camera body 1 and a crank lever 23 on the left-hand side of the camera body 1. Furthermore, the extension levers 5 and 5a are rigidly interconnected by a torque tube 5b thereby to form a rigid frame lever structure in which the axes of the pins 9 are coincidently aligned, and the axes of the pins 6 are coincidently aligned, all said axes lying always in a single plane.

The support lever 3 and the crank lever 23 are also rigidly interconnected by a torque tube 23a thereby to form a rigid support lever structure supported on pins 4 on bearing brackets 2 which are mounted rigidly on the lower forward parts of the camera body 1 on the left and right hand sides thereof.

The support lever 3 has a rear arm 3b extending rearwardly from the intermediate pivot formed by the pin 4 and is provided at its rear end with a roller 13 engaging in and guided by a cam slot 12 provided in an actuating plate 10. The actuating plate 10 is provided with an integral crank arm 14, the outer end of which is interconnected by a link 15 to an intermediate part of the extension lever 5.

Furthermore, the actuating plate 10 is rotatably supported on a horizontal pivot 11 fixed to the right-hand side of the camera body 1 and is rigidly fixed to a gear 16 which is rotated through a gear train 17 by a manually-operated knob 18. The aforementioned cam slot 12 is so formed that rotation of the actuating plate 10 results in a suitable pivotal motion of the support lever 3 about the pivot 4 as will be apparent hereinafter.

The focus adjusting mechanism of the above described construction according to the invention operates in the following manner. When, with the above described mechanism with the parts in the positions indicated by full lines in FIGURE 2, the knob 18 is turned in the direction of the arrow to cause the actuating plate 10 to rotate in the clockwise direction as viewed in FIGURE 2, the resulting rotation of the crank arm 14 is transmitted through the link 15 to cause the extension lever 5 and, therefore, the lever 5a to rotate clockwise about the pins 6.

Simultaneously, the cam slot 12 in the actuating plate 10 also rotates and operates via its engagement with the roller 13 to cause pivotal movement of the support lever 3 and, therefore, an essentially vertical movement of the lower ends of the extension levers 5 and 5a. As a result of said vertical movement and the above mentioned clockwise rotation of the levers 5 and 5a about the pins 6, the axis of the pins 9 is caused to undergo a straight-line forward movement from the original position designated by reference character A, through position B, to position C.

When the knob 18 is turned counter-clockwise, with the pins 9 in the position C, the above described operation is reversed, and the axis of the pins 9 is caused to undergo a straight-line rearward movement from position C, through the position B, to the original, retracted position A. Thus, as will be apparent to those skilled in the art, the above described straight-line, forward and rearward movements of the pins 9 are accomplished by a straight-line motion mechanism comprising essentially the extension arm 5 (moving in unison with arm 5a), the link 15, the actuating plate 10 providing with the crank arm 14 and cam slot 12, and the support lever 3, the fixed pivots being the pivots 4 and 11.

That is, in FIGURE 2, positions A and C correspond respectively to the most rearward and most forward positions of the extension levers 5 and 5a, and, accordingly, the axis of the pins 6 is at its highest position when the axis of the pins 9 are at these positions A and C. At the position B, a line passing through the pins 6 and 9 is vertical, and, therefore, the axis of the pins 6 is at its lowest position.

In accordance with the above described straight-line movement of the pins, the lens support 8 is also caused to undergo straight-line movement, the angular orientation of the lens support 8 with respect to the optical axis being maintained constant by the straight guide slots 21 which guide the rollers 20 rolling therealong, the rollers 20 being provided a the rear extremities of the extension arms 19 rigid with the lens support 8 as described hereinbefore.

In the above described manner, the lens 7 rigidly supported by the lens support 8 is caused to undergo straight-line, forward and rearward movement along its optical axis thereby to adjust its focus.

Since the above described focus adjusting mechanism according to the present invention includes extension levers which support the lens support and, moreover, through the combination of their rotation and the up-and-down movement of their pivots, move the lens support through a great distance in straight-line movement, the resulting focus adjusting action is extremely smooth. Moreover, the entire mechanism has a simple construction.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. In a photographic camera, the combination of a lens support member for holding a lens means and pivotally mounted on the camera with the pivotal mounting being movably mounted on the camera for movement between two extreme positions in a straight line parallel to the opitcal axis of the camera, and a focus adjusting mechanism comprising an extension lever structure having one end pivotally connected to the lens support member, extension lever structure mounting means having a part thereof movable in a circular arc generally transversely to the optical axis of the camera and on which part the other end of the extension lever structure is pivotally mounted, and extension lever structure rotating means coupled to said extension lever structure and to said extension lever structure mounting means for simultaneously rotating said extension lever structure around said pivotal mounting of the extension lever on the mounting means and moving said mounting means for moving the pivotal mounting means through the circular arc between a position toward the lens support member when the lens support member is at either of the two extreme positions of its movement and a position remote from the lens support member when the lens support member is intermediate the two extremes of its movement for thereby moving the lens support member in a straight line parallel to the optical axis of the camera.

2. The combination as claimed in claim 1 in which said extension lever structure mounting means is a lever pivotally mounted on the camera with said extension lever structure mounted on a free end of the lever, said extension lever structure moving means being coupled to said lever for rotating it during the movement of said extension lever structure.

3. The combination as claimed in claim 2 in which said extension lever structure moving means comprises a link having one end pivotally connected to said extension lever structure, and cam means rotatably mounted on said camera to which the other end of said link is pivotally connected and said cam means being coupled to said lever for rotating said lever.

4. In a photographic camera, the combination of a lens support member for holding a lens means and pivotally mounted on the camera with the pivotal mounting being movably mounted on the camera for movement between two extreme positions in a straight line parallel to the optical axis of the camera, and a focus adjusting mechanism comprising parallel extension levers pivoted at their upper ends to the lens support, a tube member rigidly connecting the extension levers at the lower ends thereof, a support lever pivoted intermediate its ends on the camera so that it can rotate in a plane parallel to a vertical plane passing through the optical axis of the camera, said support lever having its forward end pivoted to the lower end of one of said extension levers for pivotally supporting the lower ends of the extension levers, said support lever having a roller at the rear end thereof, an actuating plate rotatably mounted on the camera and having a cam slot therein in which said roller is engaged and having a crank arm integral therewith, a link interconnecting the end of said crank arm and a point intermediate the end of one of the extension levers, and rotating means coupled to said actuating plate for rotating it, said cam slot having a shape which causes the ends of the extension levers connected to the lens support to move in straight line movement between said two extreme positions.

References Cited

UNITED STATES PATENTS 3,103,151    9/1963    Borghesani _____ 95—40

NORTON ANSHER, *Primary Examiner.*

G. M. HOFFMAN, *Assistant Examiner.*